United States Patent Office 3,411,583
Patented Nov. 19, 1968

3,411,583
PETROLEUM RECOVERY METHOD
Le Roy W. Holm and Byron B. Woertz, Crystal Lake, Ill.,
assignors to Union Oil Company of California, Los
Angeles, Calif., a corporation of California
No Drawing. Filed Dec. 2, 1965, Ser. No. 511,226
15 Claims. (Cl. 166—42)

ABSTRACT OF THE DISCLOSURE

A method for recovcering oil from an oil-bearing formation in which a fluid comprising carbon dioxide is injected through a well and into the formation under conditions whereby carbon dioxide is absorbed by the oil, and a sparingly oil-soluble gas is subsequently injected to establish a gas phase in the formation that provides a driving force to displace fluids towards the well on the subsequent production of fluids from this same well. As the production of oil becomes diminished, the process can be repeated to recover additional quantities of oil.

---

This invention relates to a method for recovering oil from petroleum-bearing subterranean formation and is especially adapted for the recovery of heavy, viscous crudes.

Basically, the invention resides in the introduction into a subterranean oil-bearing formation of a slug of fluid comprising carbon dioxide, in as dense a state as the formation conditions permit, followed by a slug of sparingly oil-soluble gas in an amount sufficient to provide a driving force to the crude oil which has been contacted by the slug or fluid comprising carbon dioxide. Thereafter, the well through which the foregoing fluids have been injected is converted to a production well and fluids are recovered therefrom. This cyclic process may be repeated as many times as economical results are obtained. The method is especially applicable to those oil fields wherein a low financial investment is desired in that it is not necessary to drill both and injection well and a production well since only one well is utilized in the process.

The prior art has suggested the attributes of stimulating oil production from a declining-production well by the injection of a slug of carbon dioxide through the well into the formation. In other instances, the prior art has suggested the driving of a fluid comprising carbon dioxide from an injection well through a formation towards a production well with such driving fluids as carbonated water, hydrocarbon gases, etc. These prior art practices have suffered in economical merit in that it has generally been necessary to provide at least two wells penetrating the oil-bearing formation, or production of a declining-production well has not increased to that extent necessary to offset the cost of the treatment. It has now been discovered that by introducing a fluid comprising carbon dioxide into a formation wherein the pressure is such as to most favorably permit the absorption of the carbon dioxide by the petroleum deposits, thereby decreasing the viscosity of the oil, and thereafter injecting a sparingly oil-soluble gas, more of the oil in place is recovered economically than has heretofore been possible.

The method of the invention is particularly useful in the recovery of heavy, viscous crudes located in shallow subterranean reservoirs and/or in formations wherein the inherent pressures in the formation are insufficient to provide a natural driving force to drive the petroleum to a well penetrating the deposit. By injecting a second gaseous material, which is only sparingly soluble in petroleum oil, after injecting the carbon dioxide-containing slug, it is possible to create a pressure in the reservoir which, upon conversion of the injection well to a production well, will result in the creation of a pressure differential to drive the carbon dioxide-saturated-oil, or oil of reduced viscosity, towards the well.

A sparingly soluble gas, such as air or nitrogen, upon being injected into the formation, will tend to channel through the oil of reduced viscosity so as to become disposed in back of the oil thereby to provide the energy required to force the oil towards the well bore once the injection of the gas has terminated. Upon the termination of sparingly soluble gas slug injection, the well may be shut-in for a period of, for example, 1 to 3 days as a soaking period to allow the carbon dioxide fluid to be absorbed in the oil and the gas to channel through the carbon dioxide-containing oil. Then the well is converted from an injection well to a production well and fluids are recovered therefrom. In one embodiment of the invention the carbon dioxide fraction recovered from the production well may be utilized in practicing the method of the invention in the same well again or, alternatively, may be utilized as the carbon dioxide slug or fluid slug comprising carbon dioxide in another well located in proximity to the well from which it was recovered.

It is, therefore, an object of this invention to increase the amount of oil recoverd from a formation penetrated by at least one well. It is another object of this invention to improve the recovery ratio of petroleum using one well wherein a slug of carbon dioxide-containing fluid is followed by a slug of sparingly oil-soluble gas which provides the inherent energy necessary to drive the petroleum from the formation are utilized in the same well or in the injection well to a production well. A further object of this invention is to recover heavy viscous crude oils existing in pressure depleted subterranean formations. It is still a further object of this invention to provide a cyclic process wherein a fraction of the fluids recovered from the formation are utilized tin the same well or in another well in carrying out the first or second step of the overall process of the invention. These and other objects of the invention will become apparent from the following description of the invention.

In carrying out the process of the invention it is only necessary that one combination injection-production well be drilled to penetrate an oil-bearing subterranean formation. Thereafter an initial slug of fluid comprising carbon dioxide, the carbon dioxide content of the fluid being preferably at least 60 vol. %, is injected through the well and into the formation at a temperature and pressure such that the fluid enters the formation in either liquid or dense phase. The fluid desirably is in the liquid state but if the formation temperature is above the critical temperature of carbon dioxide, the fact that the fluid or carbon dioxide enters the formation as a dense fluid or in gaseous form will not affect the overall process detrimentally. The amount of carbon dioxide or fluid comprising carbon dioxide desirably is that amount which will substantially reduce the viscosity of the crude oil located at least in proximity to the injection-production well. Since carbon dioxide is absorbed by petroleum oil and reduces the viscosity thereof, it will generally be preferred to inject that amount of carbon dioxide-containing fluid or carbon dioxide per se that will reduce the viscosity of the oil within a radial distance from the well of about 20 to 100 feet. Generally speaking, an amount comprising about 1% to 5% of the pore volume of the formation within this radial distance will suffice. If the formation or reservoir into which the carbon dioxide-containing slug is injected has a low inherent pressure, it is generally preferred to pre-pressure the formation with a fluid such as engine exhaust gas, flue gas, $CO_2$, etc. Ideally, the pressure of the formation to be treated with $CO_2$ should be about 500 to 800 p.s.i. to permit as great a dissolution of the carbon dioxide from the carbon dioxide slug in the crude oil as is possible. The greater the carbon dioxide saturation of the crude oil which is to be recovered, the lower its viscosity will be and the more readily it will be recovered.

After the injection of the fluid comprising carbon dioxide, a sparingly oil-soluble gas such as nitrogen, air, etc., is injected into the well and into the formation in an amount sufficient to provide a driving force to the reduced-viscosity oil to drive the oil towards the well upon completion of the injection of the sparingly oil-soluble gas, when the well is converted from an injection well to a production well. The pressure under which the sparingly soluble gas is injected may be any pressure so long as it is sufficient to maintain the pressure of the carbon dioxide treated portion of the reservoir at about 600 to 1000 p.s.i. The slightly soluble gas, therefore, may be injected at any pressure consistent with the foregoing and below that at which fracturing of the formation would occur. As the gas is being injected it, being insoluble for all practical intents and purposes in the carbon dioxide-saturated oil, will tend to channel through and finger through the oil to a point beyond the band of carbon dioxide-saturated oil and, upon conversion of the injection well to a production well, will provide the necessary driving energy to drive the reduced viscosity oil towards the well bore from which it may be recovered. The amount of sparingly oil-soluble gas injected will normally comprise about 3% to 25% of the pore volume of the 100 ft. radial portion of the reservoir around the well although under ordinary circumstances about 10% pore volume will suffice.

Following injection of the fluid comprising carbon dioxide, and subsequent injection of the sparingly oil-soluble gas, the well preferably is shut in for a period of time to permit the carbon dioxide to become dissolved in the crude oil, and the sparingly oil-soluble gas to channel through and become distributed throughout the intended zone. Ordinarily, a shut-in period of 1 to 3 days will suffice, and in general a period within this range is preferred, but a period of less than 1 day will suffice in some reservoirs while a period of more than 3 days will be required in others.

While liquid carbon dioxide is preferred as the initial slug of fluid comprising carbon dioxide, a fluid containing a high percentage, preferably over 60%, of carbon dioxide may also be used. As heretofore mentioned, while it is preferred that the carbon dioxide be introduced in the liquid form, it is not necessarily critical to the practice of the invention that it exist in liquid form and as a matter of fact it would be impossible to have it exist in such a form if the critical temperature of the carbon dioxide were to be exceeded. In those instances where the temperature of the formation is above the critical temperature of the carbon dioxide, the slug of fluid comprising carbon dioxide may be introduced into the formation as a dense fluid or gas. It is desirable to use enough carbon dioxide to saturate the oil around the well to a distance of about 20 to 100 feet from the well, and preferably to about 50 feet from the well since, as the carbon dioxide is absorbed in the heavy reservoir oil around the well bore, there is a material reduction of viscosity of the oil and as a consequence, improved flow of the oil is made possible.

The slug of sparingly soluble gas following the carbon dioxide slug generally should be enough to create a gas saturation of about 5% in the area extending to about 50–100 feet from the well bore. This gas slug provides the energy necessary to drive the thinned out oil around the well into the well bore since when initially injected it channels through the reduced viscosity oil and builds up pressure out beyond the band of reduced viscosity oil. In some instances it may be found that the driving force created by the sparingly soluble gas is insufficient to drive the oil to the surface of the earth so that pumping of the well may be necessary to aid in the production of the reservoir fluids.

In another embodiment of the invention, a part of the gasiform fluids produced during the oil production cycle of the process may be recovered, compressed and used as the carbon dioxide-containing slug in another well, or in the same well in successive cycles. This fraction that is separated from the produced fluids will contain a high concentration of carbon dioxide. As long as the produced gasiform fluid contains more carbon dioxide than engine exhaust gas or other gases available, it may be reused either as the carbon dioxide-containing slug, or alternatively, if the carbon dioxide content is low, as the sparingly soluble gas slug following the carbon dioxide-containing slug. The concentration of carbon dioxide in the produced gas will determine in which phase of the process it may be used. Thus, produced gasiform fluids containing 60% carbon dioxide or more may be used as the carbon dioxide-containing slug to reduce the oil viscosity, while those fluids containing less than about 60% carbon dioxide may be used as the sparingly soluble gas slug to provide the necessary energy to drive the oil of reduced viscosity towards the well bore.

As a specific example of this invention, a reservoir at an initial pressure of 100 p.s.i.g. having a thickness of approximately 20 feet has an oil saturation of 70% pore volume wherein the oil viscosity is 100 centipoises. The porosity of the reservoir is 20%. Approximately 60,000 s.c.f. of engine exhaust gas at a pressure of 700 p.s.i.g. is injected into the reservoir until the pressure in the area around the well has been increased to 500 p.s.i.g. Thereafter, a slug of liquid carbon dioxide comprising 200 barrels is injected into the reservoir, which is at a temperature of 100° F. The carbon dioxide is absorbed in the oil in the pore volume for 50 feet around the well bore. Thereafter, flue gas in the amount of 225,000 s.c.f. is injected to saturate the volume of the reservoir between 50 feet and 100 feet radius from the well bore to 5% of the pore volume at 700 p.s.i. After the injection of the flue gas, the well is shut-in for one day and then is converted to a production well and fluids are recovered until the ratio of oil to other fluids produced becomes uneconomically low.

While the invention has been described with respect to a specific oil recovery process, other methods for applying it to the recovery of oil should be obvious to those skilled in the art. For example, more than one well bore may be treated at any given time so as to make practical use of the gasiform fluids produced from one well which have high carbon dioxide contents, as heretofore mentioned, as the initial slug of fluid comprising carbon dioxide which is the first step of the overall cyclic process. The only limitations which are to be imparted to the invention are those that are specifically contained in the appended claims.

The embodiments of the invention in which an exclusive property or privilege is claimed are defined as follows:

1. The method of recovering oil from an oil-bearing subterranean formation penetrated by at least one combination injection-production well, which comprises the steps of:

injecting a fluid comprising carbon dioxide through said well and into said formation at a pressure conducive to the absorption of said carbon dioxide by the formation oil in an amount sufficient to substantially reduce the viscosity of the oil located at least in proximity to said well;

thereafter injecting a sparingly oil-soluble gas through said well and into said formation to establish therein a gas phase that provides a driving force to move fluids towards the well on the subsequent production of said well;

discontinuing the injection of said sparingly oil-soluble gas; and thereafter recovering fluids from said well.

2. The method in accordance with claim 1 wherein said fluid comprising carbon dioxide contains at least 60 vol. % carbon dioxide.

3. The method according to claim 1 wherein said fluid comprising carbon dioxide consists essentially of carbon dioxide and said carbon dioxide enters said formation as a dense fluid.

4. The method according to claim 1 wherein the amount of said carbon dioxide injected comprises about 1% to 5% of the pore volume of said formation within a radial distance of about 20–100 feet of said well.

5. The method according to claim 1 wherein said sparingly oil-soluble gas comprises nitrogen.

6. The method according to claim 1 wherein said sparingly oil-soluble gas is air.

7. The method according to claim 1 wherein the amount of said sparingly oil-soluble gas injected comprises about 3% to 25% of the pore volume of said formation within a radial distance of about 50–100 feet of said well.

8. The method according to claim 1 wherein the formation pressure prior to the injection of said fluid comprising carbon dioxide is within the range of about 500 to 800 p.s.i.g.

9. The method according to claim 1 wherein the initial formation pressure is less than about 500 p.s.i.g. and a gas selected from the group consisting of carbon dioxide, flue gas, engine exhaust gas, air and nitrogen is injected to increase the pressure in said formation to between about 500 and 800 p.s.i.g. prior to injecting said fluid comprising carbon dioxide.

10. The method according to claim 1 wherein steps described therein are cyclically repeated until further production becomes uneconomical.

11. The method according to claim 1 wherein the well is shut in following the injection of said sparingly oil-soluble gas to permit the carbon dioxide to become absorbed in said oil and said sparingly oil-soluble gas to become distriubted in said formation.

12. The method of recovering oil from an oil-bearing subterranean formation penetrated by at least one combination injection-production well, which comprises the steps of:

injecting a fluid comprising carbon dioxide through said well and into said formation, the formation having an initial pressure of at least about 500 p.s.i.g., and said fluid being injected in an amount sufficient to substantially saturate the oil within a radial distance of about 20 to 100 feet from said well whereby the viscosity of said oil is substantially reduced;

thereafter injecting a sparingly oil-soluble gas through said well and into said formation to establish therein a gas phase that provides a driving force to move fluid toward the well;

discontinuing the injection of said sparingly oil-soluble gas;

shutting in said well for a period of time to permit the carbon dioxide to become absorbed in said oil and said sparingly oil-soluble gas to become distributed in said formation; and recovering fluids from said well.

13. The method according to claim 12 wherein said sparingly oil-soluble gas is injected in an amount equivalent to about 3% to 25% of the pore volume of said formation within a radial distance of about 50–100 feet of said well.

14. The method according to claim 12 wherein the steps described therein are cyclically repeated until further production becomes uneconomical.

15. The method according to claim 12 wherein said fluid comprising carbon dioxide consists essentially of carbon dioxide and comprises about 1% to 5% of the pore volume of said formation within a radial distance of about 20–100 feet of said well.

References Cited
UNITED STATES PATENTS

| | | | |
|---|---|---|---|
| 3,333,637 | 8/1967 | Prats | 166—2 X |
| 2,623,596 | 12/1952 | Whorton et al. | 166—7 |
| 2,822,872 | 2/1958 | Rzasa et al. | 166—9 |
| 2,885,003 | 5/1959 | Lindauer | 166—42 X |
| 3,075,918 | 1/1963 | Holm | 166—9 X |
| 3,100,528 | 8/1963 | Plummer et al. | 166—42 |
| 3,256,933 | 6/1966 | Murphree et al. | 166—9 X |
| 3,262,498 | 7/1966 | Connally et al. | 166—9 |

ERNEST R. PURSER, *Primary Examiner.*